United States Patent
Youn et al.

(10) Patent No.: US 8,483,151 B2
(45) Date of Patent: Jul. 9, 2013

(54) METHOD OF EMERGENCY SERVICE REQUEST USING CONTROL CHANNEL

(75) Inventors: Ae Ran Youn, Anyang-Si (KR); Yong Ho Kim, Anyang-Si (KR); Ki Seon Ryu, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 381 days.

(21) Appl. No.: 12/671,456

(22) PCT Filed: Jul. 23, 2008

(86) PCT No.: PCT/KR2008/004306
§ 371 (c)(1),
(2), (4) Date: Jan. 29, 2010

(87) PCT Pub. No.: WO2009/017323
PCT Pub. Date: Feb. 5, 2009

(65) Prior Publication Data
US 2010/0202378 A1 Aug. 12, 2010

(30) Foreign Application Priority Data
Jul. 30, 2007 (KR) ......................... 10-2007-0076454

(51) Int. Cl.
*H04W 4/00* (2009.01)
(52) U.S. Cl.
USPC ...... 370/329; 370/259; 455/404.1; 455/452.1
(58) Field of Classification Search
None
See application file for complete search history.

(56) References Cited

U.S. PATENT DOCUMENTS

| 2003/0214928 A1* | 11/2003 | Chuah ........................... 370/336 |
| 2004/0151283 A1* | 8/2004 | Lazoff ............................. 379/45 |
| 2004/0196864 A1 | 10/2004 | Benveniste |
| 2005/0250499 A1* | 11/2005 | Lee et al. ....................... 455/437 |
| 2006/0088020 A1* | 4/2006 | Gass ............................... 370/338 |
| 2007/0178880 A1* | 8/2007 | Saito et al. .................... 455/405 |
| 2007/0285857 A1* | 12/2007 | Berkowitz et al. .............. 361/64 |
| 2008/0298313 A1* | 12/2008 | Salminen ....................... 370/329 |
| 2009/0252120 A1* | 10/2009 | Kim et al. ...................... 370/331 |
| 2009/0279509 A1* | 11/2009 | Reumerman et al. ......... 370/335 |
| 2010/0111099 A1* | 5/2010 | Yonge et al. .................. 370/458 |
| 2010/0135205 A1* | 6/2010 | Li et al. ......................... 370/328 |

OTHER PUBLICATIONS

IEEE Computer Society, "802.16 IEEE Standard for Local and metropolitan area networks Part 16: Air Interface for Fixed Broadband Wireless Access Systems", Oct. 1, 2004, IEEE Std 802.16-2004, pp. 237,697,698.*

(Continued)

*Primary Examiner* — Chi Pham
*Assistant Examiner* — Mohammad Adhami
(74) *Attorney, Agent, or Firm* — Birch, Stewart, Kolasch & Birch, LLP (57) ABSTRACT

A method for performing emergency communication between a mobile station and a base station in a wireless communication system is disclosed. The method includes receiving allocation of a contention-free-based control channel from a base station, and transmitting an emergency service request message through the contention-free-based control channel. The contention-free-based control channel may be one of a channel quality indicator (CQI) channel and an acknowledgement/negative-acknowledgement (ACK/NACK) channel. Since the emergency service request message can be transmitted through a contention-free dedicated code and a dedicated region, a procedure is simplified and power resources of the mobile station can be saved.

6 Claims, 5 Drawing Sheets

OTHER PUBLICATIONS

T. Kim, et al., "Priority Toning Strategy for Fast Emergency Notification in IEEE 802.15.4 LR-WPAN", in Proceedings of the 15th Joint Conference on Communications & Information (JCCI), Apr. 2005; See Section 3.2; Figures 1 and 3.

D, Gu, et al., "QoS Enhancement in IEEE 802.11 Wireless Local Area Networks", IEEE Communications Magazine, vol. 41, Issue 6, pp. 120-124, Jun. 2003. See 'EDCF and HCF'.

* cited by examiner

METHOD OF EMERGENCY SERVICE REQUEST USING CONTROL CHANNEL

TECHNICAL FIELD

The present invention relates to a wireless communication system.

BACKGROUND ART

In a mobile communication environment, a contention-based uplink bandwidth request process is needed for a mobile station to request that a base station provide an emergency service or an emergency data delivery service. If a plurality of mobile stations makes an uplink bandwidth request in the same time interval, collisions may occur between mobile stations. If no response is received from the base station even though the bandwidth request has been made, since it is assumed that collisions have occurred, the mobile station retransmits a bandwidth request to the base station.

Meanwhile, if a mobile station desires to request that a base station provide a desired service under the circumstance that the mobile station has been registered in the base station, a necessary bandwidth is assigned to the mobile station through a contention-based uplink bandwidth request process and multi-step procedures for setting specific services should additionally be implemented.

However, in the case where a service requested by the mobile station is an emergency service or emergency data delivery service, if an emergency call connection is delayed due to collisions of the bandwidth request or complicated procedures required for a service providing process, serious problems may arise. Furthermore, bandwidth request information may be re-transmitted because a bandwidth request using a ranging channel is made based on contention as described above. Therefore, wireless resources, such as power resources and frequencies of a mobile station, may be wasted and data transmission may be delayed.

DISCLOSURE

Technical Problem

An object of the present invention devised to solve the problem is to support efficient data communication.

Another object of the present invention devised to solve the problem is to provide a method for transmitting emergency service request information to a base station through an uplink control channel by a mobile station which has established a connection with the base station.

Still another object of the present invention devised to solve the problem is to provide a method for requesting that a base station provide an emergency service request through a control channel such as a channel quality indicator (CQI) channel or an acknowledgement/negative-acknowledgement (ACK/NACK) channel.

A further object of the present invention devised to solve the problem is to provide a method for minimizing power resource consumption of a mobile station, simplifying an uplink bandwidth request procedure, and minimizing a data delivery delay, by a contention-free-based service request.

Technical Solution

To solve the technical problem, the present invention provides a method for providing an emergency service in a wireless communication system.

In one aspect of the present invention, provided herein is a method for making a request for an emergency service in a wireless access system, including receiving allocation of a contention-free-based control channel from a base station, and transmitting an emergency service request message through the contention-free-based control channel, wherein the contention-free-based control channel is dedicated to a mobile station. The contention-free-based control channel may be one of a channel quality indicator (CQI) channel and an acknowledgement/negative-acknowledgement (ACK/NACK) channel.

In another aspect of the present invention, provided herein is a method for providing an emergency service in a mobile communication system, including: allocating a contention-free-based control channel to a mobile station, receiving an emergency service request message from a mobile station through the contention-free-based control channel, and generating an emergency service flow and a parameter related to the emergency service, using information included in the emergency service request message, and transmitting the parameter to the mobile station. The control channel may be one of a CQI channel and an ACK/NACK channel.

Advantageous Effects

Exemplary embodiments of the present invention have the following advantages.

First, a mobile station can efficiently perform data communication with a base station.

Second, since a mobile station transmits emergency service request information to a base station through a contention-free-based uplink control channel, a communication procedure is simplified and power resources of the mobile station can be saved.

Third, since a mobile station transmits emergency service request information to a base station through a control channel such as a CQI channel or an ACK/NACK channel, an emergency service request message can be transmitted through a contention-free-based dedicated code and a dedicated region. Therefore, a bandwidth request procedure of the mobile station is simplified and power resources of the mobile station can be saved.

Fourth, a data delivery delay can be minimized by transmission of an emergency service request message through a dedicated control channel by a mobile station.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

The following description is made of a method for performing emergency communication between a mobile station and a base station in a wireless access system.

Reference will now be made in detail to the exemplary embodiments of the present invention with reference to the accompanying drawings. The detailed description is intended to explain exemplary embodiments of the present invention, rather than to show the only embodiments that can be implemented according to the invention. In the following description, a variety of specific elements are shown and the description of such elements has been made only for a better understanding of the present invention. A detailed description of known functions and configurations incorporated herein will be omitted when it may obscure the subject matter of the present invention.

A fast feedback channel allows a mobile station to rapidly transmit physical control information to a base station. The fast feedback channel is used to transmit CQI information or multi-input multi-output (MIMO) information. The base station may inform the mobile station of a region and method to use the fast feedback channel.

Figure 1:
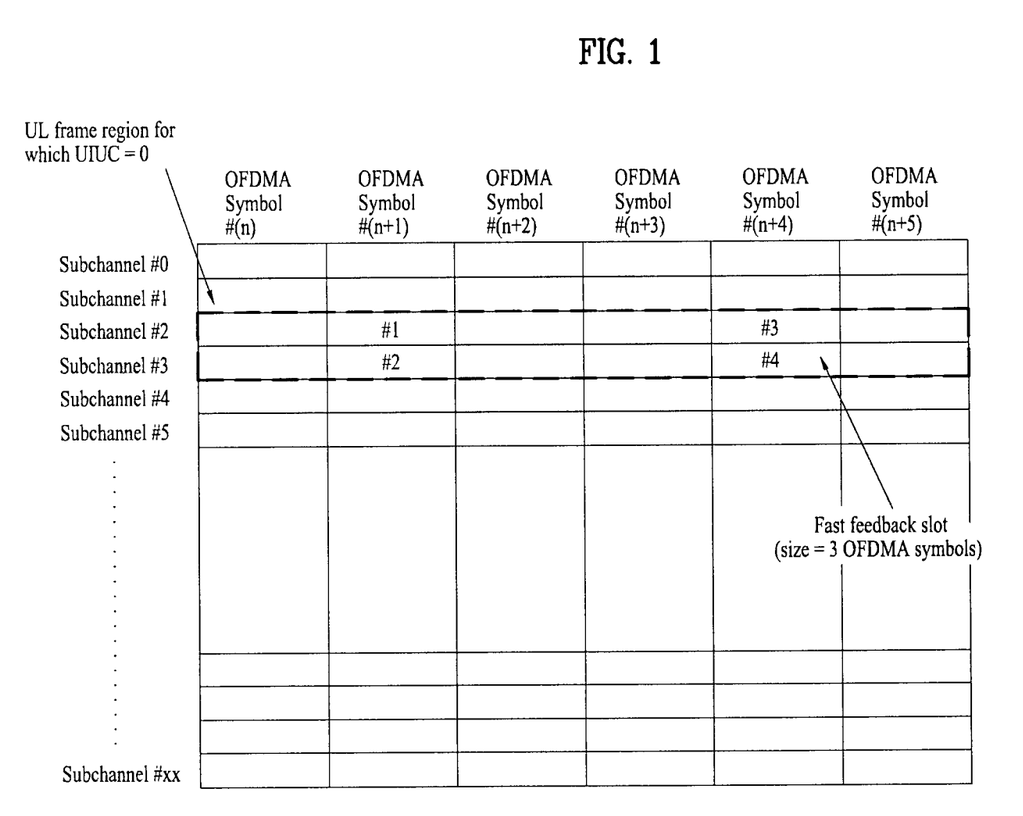
FIG. 1 is a diagram illustrating a channel allocation order per mobile station in a fast feedback channel.

FIG. 1 is a diagram illustrating a channel allocation order per mobile station in a fast feedback channel.

A CQI channel allocation information element (IE) includes information indicating where a base station transmits a CQI when the base station transmits the CQI using the fast feedback channel to a mobile station. A fast feedback message occupies one uplink slot. As illustrated in FIG. 1, fast feedback messages give priority to frequency and are mapped in a region indicated by 'UIUC=0' within an uplink map (UL-MAP). A fast feedback region is allocated using a fast feedback allocation IE.

The following Table 1 illustrates an example of a fast feedback allocation IE format.

TABLE 1

| Syntax | Size(bits) | Notes |
| --- | --- | --- |
| Fast_Feedback_alloction_IE( ){ | | |
| OFDMA symbol offset | 8 | |
| Subchannel offset | 7 | |
| No. OFDMA symbol | 7 | |
| No. subchannels | 7 | |
| Reserved | 3 | |
| } | | |

Referring to FIG. 1, a part of an uplink subframe is used as a fast feedback region. Channel allocation order is as shown in FIG. 1. One subchannel (i.e., 48 data subcarriers) is used to express one CQI (6 bits). A subchannel is comprised of 6 tiles located throughout the entire bandwidth.

In more detail, CQI information may be mapped to any one of 4 slots within a region indicated by dotted lines. When mapping the CQI information to subcarriers of a fast feedback channel, the subcarriers may be modulated using a vector index.

The following Table 2 illustrates an example of fast feedback subcarrier modulation in an individual vector.

TABLE 2

| Vector index | Data subcarrier modulation per Code word Subcarrier(0), Subcarrier(1), . . . Subcarrier(7) |
| --- | --- |
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

$$P0 = \exp\left(j \cdot \frac{\pi}{4}\right)$$

$$P1 = \exp\left(j \cdot \frac{3\pi}{4}\right)$$

$$P2 = \exp\left(-j \cdot \frac{3\pi}{4}\right)$$

$$P3 = \exp\left(-j \cdot \frac{\pi}{4}\right)$$

In partial usage of a subchannel (PUSC; 48 data subcarriers+24 pilot subcarriers) or optional PUSC (OPUSC; 48 data subcarriers+6 pilot subcarriers) structure as a subchannelization method, a vector index of Table 2 per tile is mapped as shown in the following Table 3, thereby mapping 6 bits of CQI information.

Table 3 illustrates an example of an improved fast feedback channel subcarrier modulation.

TABLE 3

| 6-bit Payload (binary) | Fast-feedback vector indices per Tile Tile(0), Tile(1), . . . Tile(5) |
| --- | --- |
| 000000 | 0, 0, 0, 0, 0, 0 |
| 000001 | 1, 1, 1, 1, 1, 1 |
| 000010 | 2, 2, 2, 2, 2, 2 |
| 000011 | 3, 3, 3, 3, 3, 3 |
| 000100 | 4, 4, 4, 4, 4, 4 |
| 100000 | 6, 7, 5, 1, 2, 4 |
| 100001 | 7, 6, 4, 0, 3, 5 |
| 100010 | 4, 5, 7, 3, 0, 6 |
| 100011 | 5, 4, 6, 2, 1, 7 |
| 100100 | 2, 3, 1, 5, 6, 0 |

Table 3 illustrates 6-bit codes which can be expressed as a total of 64 different codes. Table 3 shows a part of the 64 different codes. A method of configuring the other codes will be apparent to those skilled in the art.

Figure 2:
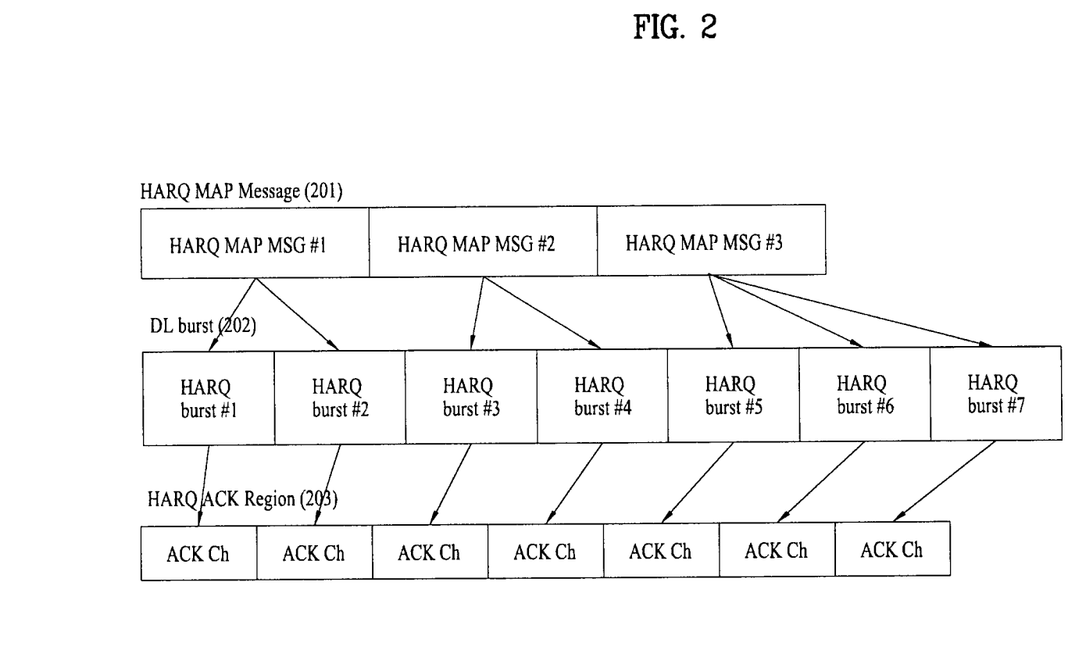
FIG. 2 is a diagram illustrating a method of allocating a hybrid automatic repeat request (HARQ) acknowledgment (ACK) channel in a HARQ acknowledgement channel region.

FIG. 2 is a diagram illustrating a method of allocating a hybrid automatic repeat request (HARQ) acknowledgment (ACK) channel in a HARQ ACK channel region.

A HARQ MAP message 201 illustrated in FIG. 2 may be used to support HARQ in an orthogonal frequency division multiple access (OFDMA) system. A downlink map (DL-MAP) includes HARQ and submap pointers. If the HARQ pointer points to the location of a HARQ map, the HARQ MAP message 201 sequentially allocates a downlink burst 202 to the subchannel axis of a downlink. A start location of the burst is an end location of a previous burst. A wireless resource is occupied by a length allocated from the start location. This may be applied to an uplink. The mobile station may inform an ACK channel region (HARQ ACK region) 203 whether the transmitted data burst has successfully been received as an ACK/NACK signal.

In more detail, if the mobile station receives the nth HARQ burst in the ith frame, the mobile station transmits the ACK/

NACK signal to the nth half-subchannel of an ACK channel region of the (i+j)th frame uplink. In this case, a frame offset j is defined in a HARQ ACK delay field for a downlink burst of an uplink channel descriptor (UDC) message.

Next, a ranging channel used to transmit bandwidth request (BR) information and a bandwidth request process using the ranging channel will be described.

The ranging channel is basically content-based as described above. That is, if multiple users transmit any one of code division multiple access (CDMA) codes to an allocated region, multiple codes are transmitted to that region. A base station decodes the region. If codes capable of reading are present, the base station performs a ranging or bandwidth request procedure for the user which has transmitted the codes. A CDMA code used for the ranging procedure may employ a code generated by a pseudo random bit sequence (PRBS) generator.

The PRBS generator is initiated by a seed sequence {0, 0, 0, 0, 0, 0, 0, 1, 0, 1, 0, 1, 0, 0, 1} and generates a long sequence Ck as an output sequence. Therefore, the ranging procedure can generate 288 codes having a length of 144 bits by truncating the output sequence. A part of the 288 codes may be used for the above-described bandwidth request.

Figure 3:
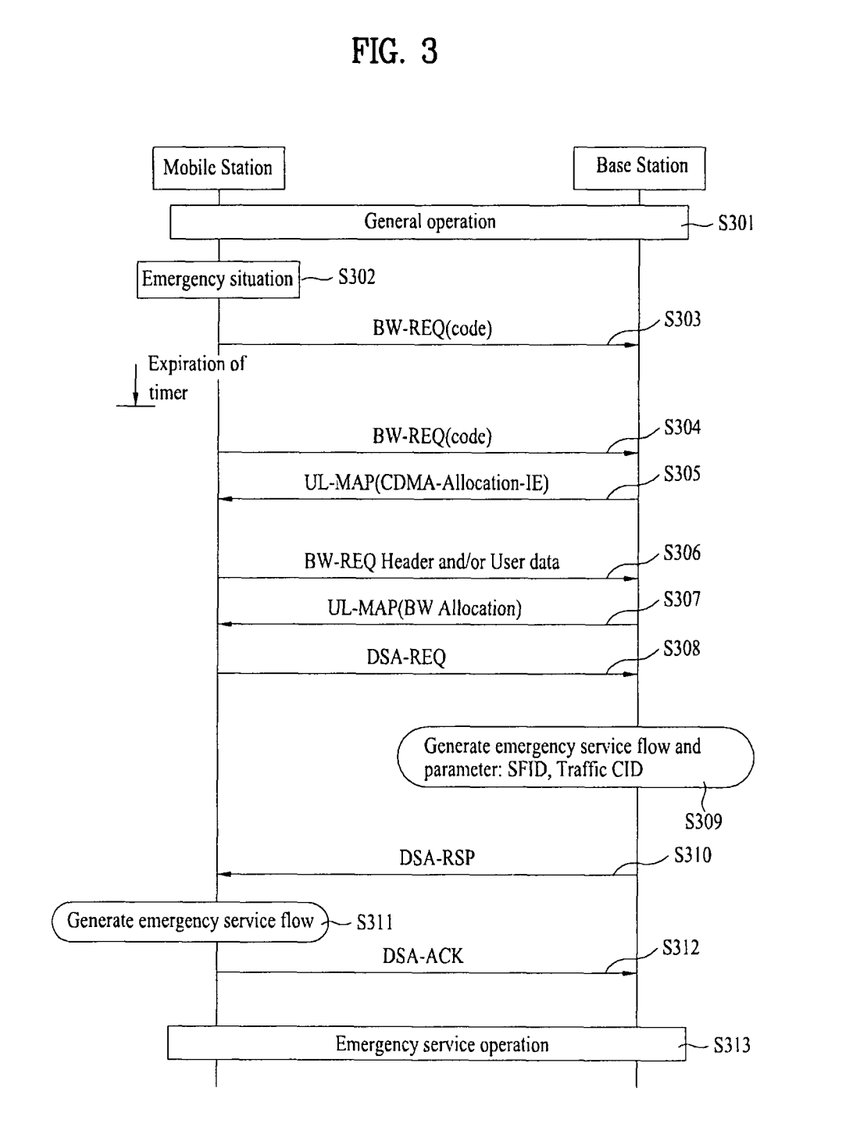
FIG. 3 is a flow chart illustrating a general process of making a bandwidth request to set an emergency communication path by a mobile station.

FIG. 3 is a flow chart illustrating a general process of making a bandwidth request to set an emergency communication path by a mobile station.

A mobile station and a base station perform a general operation to establish a connection (step S301). In step S301, a basic capability negotiation process is performed between the mobile station and the base station. The mobile station and the base station negotiate whether an emergency service can be supported in the basic capability negotiation process (for example, subscriber station basic capability negotiation request/response (SBC-REQ/RSP)) and may previously negotiate a corresponding service type, a quality of service (QoS) parameter set, a service flow identifier (ID), etc.

The following Table 4 illustrates an example of a SBC-REQ/RSP message used for the basic capability negotiation procedure between the mobile station and the base station and represents whether an uplink control channel supports a service.

TABLE 4

| Type | Length | Value | Region |
|------|--------|-------|--------|
| 173 | 1 | Bit #0: 3 bit-MIMO Fast-feedback<br>Bit #1: Enhanced FAST_FEEDBACK Under negotiation for SBC fast feedback, if enhanced feature is enabled, the SS should use only the enhanced fast-feedback channel in the CQICH allocation IE.<br>Bit #2: UL ACK<br>Bit #3: Emergency Service request supported<br>Bit #4: UEP fast-feedback<br>Bit #5: A measurement report shall be performed on the last DL burst, as described in 8.4.5.4.10.1<br>Bit #6: Primary/Secondary FAST_FEEDBACK<br>Bit #7: DIUC-CQI Fast-feedback | SBC-REQ<br>SBC-RSP |

Each field included in Table 4 indicates a control channel supported by a mobile station for uplink transmission. A bit of '1' indicates that a corresponding service is supported, and a bit of '0' indicates that a corresponding service is not supported. Especially, Bit #3 indicates whether an emergency service request is supported by the mobile station. That is, if a corresponding bit of Bit #3 is '1', the mobile station supports the emergency service request.

The following Table 5 illustrates an example capable of being referred to when Bit #3 shown in Table 4 is set to '1'

TABLE 5

| Type | Length | Value | Region |
|------|--------|-------|--------|
| 164 | 2 | Bits #0-7: Traffic Priority for Emergency Service | SBC-REQ |
|  |  | Bits #8-15: Type of Data Delivery Services | SBC-RSP |

Table 5 indicates priority for an emergency service flow and a data delivery service type when an emergency service is supported by a mobile station. A bit of '1' indicates that a corresponding service is supported and a bit of '0' indicates that a corresponding service is not supported.

Referring back to FIG. 3, a general process for a bandwidth request to establish an emergency communication path will now be described.

In step S301, when the mobile station and the base station performs a general operation, the mobile station receives a CDMA code set including an uplink channel descriptor (UCD) message from the base station and interprets information transmitted thereafter through a downlink channel.

In a mobile communication environment, if an emergency situation occurs that the mobile station requests that the base station provide an emergency service or emergency data delivery service (step S302), the mobile station scans a UL-MAP and selects a random subchannel, a symbol, a bandwidth code, or the like.

The mobile station transmit a bandwidth request (BW-REQ) code for an emergency service request to the base station (step S303). Since a bandwidth request through a ranging channel is contention-based, if a plurality of mobile stations simultaneously transmits codes for the bandwidth request to the base station, collisions may occur. If collisions occur between the messages transmitted by the plurality of mobile stations, no response to the bandwidth request transmitted in step S303 may be received from the base station. If a prescribed time elapses and a timer (for example, timer T16) expires, backoff may occur. The mobile station repeats the above-described procedure using a backoff algorithm. Namely, the mobile station re-transmits the BW-REQ code to the base station to make a bandwidth request for an emergency service (step S304).

The base station which has received the BW-REQ code broadcasts a CDMA allocation IE (CDMA-Allocation_IE) including subchannels, symbols, bandwidth codes, etc. through the UL-MAP (step S305).

The CDMA allocation IE allocates an uplink resource corresponding to the size of a bandwidth request header of the mobile station. The mobile station which has received the CDMA allocation IE transmits bandwidth request header and/or user data including the size of the bandwidth request header and mobile station ID information to the base station (step S306).

The base station, upon receiving the bandwidth request header and/or user data from the mobile station in step S306, allocates the requested bandwidth to the mobile station through the UL-MAP (step S307). The mobile station to which the bandwidth has been allocated in step S307 requests information as to an emergency service using a dynamic service addition request (DSA-REQ) message (step S308).

The base station, having received the DSA-REQ message, confirms whether a corresponding mobile station is valid and whether a QoS parameter set of an uplink/downlink emergency service flow requested by a corresponding mobile station can be supported, based on information included in the bandwidth request header. If the QoS parameter set is supported, the base station generates a service flow ID (SFID) and a traffic connection ID (CID) and maps the generated SFID and the traffic CID (step S309).

The base station transmits a dynamic service addition response (DSA-RSP) message including at least one of the traffic CID mapped with the SFID for the emergency service flow, and a corresponding QoS parameter set to the mobile station (step S310).

Upon receipt of a parameter for the emergency service flow from the base station, the mobile station generates a service flow for providing an emergency service using a corresponding parameter (step S311). If the mobile station normally receives the SFID, traffic CID, etc. for providing an emergency service and successfully generates the emergency service flow, the mobile station transmits a dynamic service addition acknowledgement (DSA-ACK) message as a response thereto to the base station (step S312).

Then the emergency service flow is formed between the base station and the mobile station and thus an emergency service operation is performed (step S313).

Figure 4:
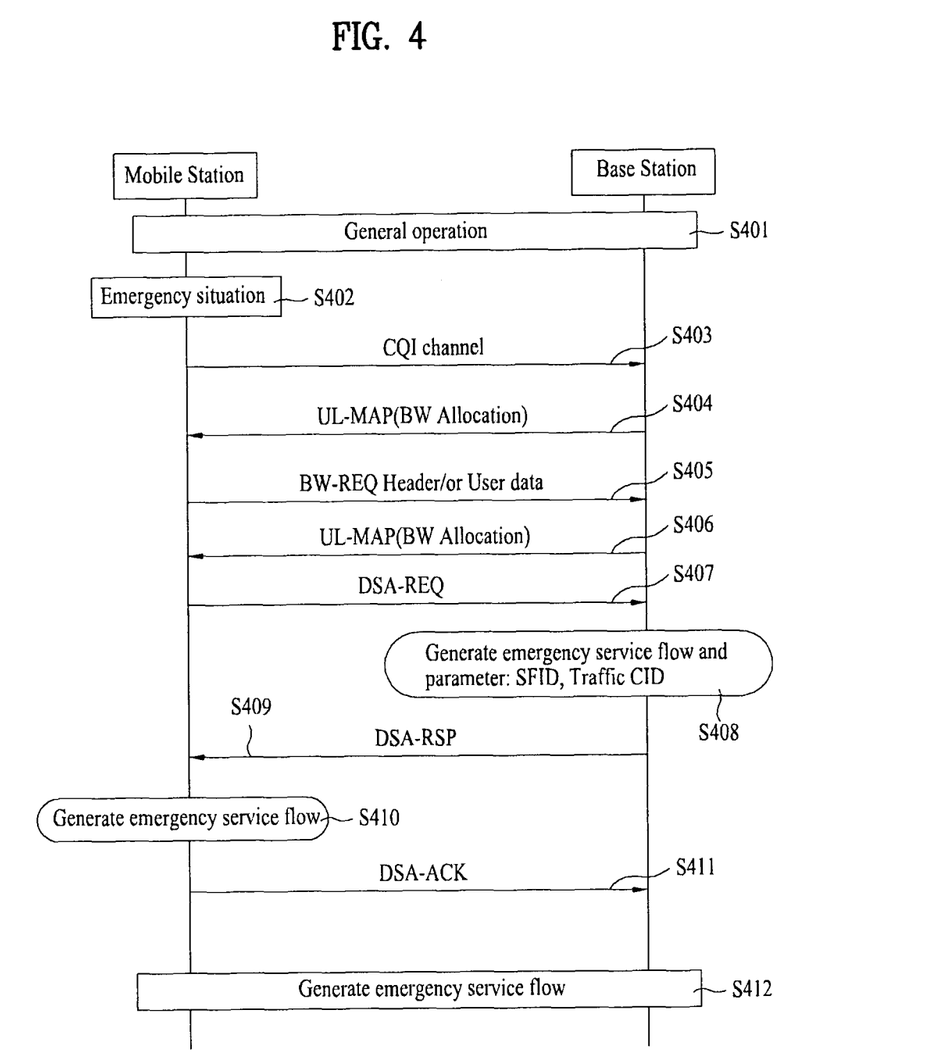
FIG. 4 is a flow chart illustrating a method of transmitting emergency service request information using a CQI channel by a mobile station according to an exemplary embodiment of the present invention.

FIG. 4 is a flow chart illustrating a method for a mobile station to transmit emergency service request information using a CQI channel according to an exemplary embodiment of the present invention.

Referring to FIG. 4, a general operation procedure (step S401) is similar to the general operation shown in FIG. 3. However, in the exemplary embodiment of the present invention, the mobile station and the base station do not allocate a new channel as is used in a general method to perform an emergency service operation. Instead, if a specific control channel (for example, a CQI channel or an ACK/NACK channel) is formed between the mobile station and the base station, an emergency service can be requested using the control channel.

After a connection is established between the mobile station and the base station, an emergency situation may occur that the mobile requests that the base station provide an emergency service or emergency data delivery service (step S402).

The exemplary embodiment of the present invention assumes that a connection between the mobile station and the base station has been established. The control channel refers to an uplink channel or a downlink channel allocated to the mobile station by the base station. The CQI channel or the ACK/NACK channel is an example of the control channel. In the exemplary embodiment of the present invention, the mobile station requests that the base station provide a contention-free-based emergency service using the CQI channel (step S403).

In step S403, the mobile station may make a request for an emergency service using a designated code instead of a CQI signal. The designated code to the CQI channel may use a 6-bit payload corresponding to an enhanced fast feedback channel. For example, an arbitrary code '100011' among 64 codes in Table 3 may be designated as a code for an emergency service. If another code is designated for the emergency service between the mobile station and the base station, the mobile station may make a request for the emergency service using another code.

In step S403, a control signal may be phase-shifted and may then be transmitted to the base station to make a request for the emergency service. That is, if the base station broadcasts a specific phase shift value to the mobile station through a UCD message, the mobile station shifts a phase of a CQI code value designated by the phase shift value, when transmitting the designated CQI code value through the CQI channel during the emergency service request. In this case, it is assumed that information indicated by the code value according to a specific phase shift value is predefined between the mobile station and the base station.

In step S403, if the mobile station transmits a designated code for the emergency service to the base station through the CQI channel, the base station allocates an uplink resource for transmitting the bandwidth request header and/or user data to the mobile station (step S404).

The mobile station transmits a bandwidth request header and/or user data including size information of data to be transmitted to the base station through the allocated uplink resource (step S405).

In step S405, the base station which has received the bandwidth request header and/or user data from the mobile station allocates a bandwidth requested through a UP-MAP to the mobile station (step S406). The mobile station to which the bandwidth has been allocated in step S406 requests information as to the emergency service using a DSA-REQ message (step S407).

The base station which has received the DSA-REQ message confirms whether a corresponding mobile station is valid and whether a QoS parameter set of an uplink/downlink emergency service flow requested by the corresponding mobile station can be supported, based on information included in the bandwidth request header. If the QoS parameter set is supported, the base station generates a new service flow ID (SFID) and a traffic CID and maps the generated SFID and traffic CID (step S408).

The base station transmits a DSA-RSP message including at least one of the traffic CID mapped with the SFID for the emergency service flow, and a corresponding QoS parameter set to the mobile station (step S409).

The mobile station which has received a parameter for the emergency service flow from the base station generates a service flow for providing an emergency service using a corresponding parameter (step S410). If the mobile station normally receives the SFID, traffic CID, etc. for providing the emergency service and successfully generates an emergency service flow, the mobile station transmits a DSA-ACK message to the base station (step S411).

Then the emergency service flow is formed between the base station and the mobile station and thus an emergency service operation is performed (step S412).

Figure 5:
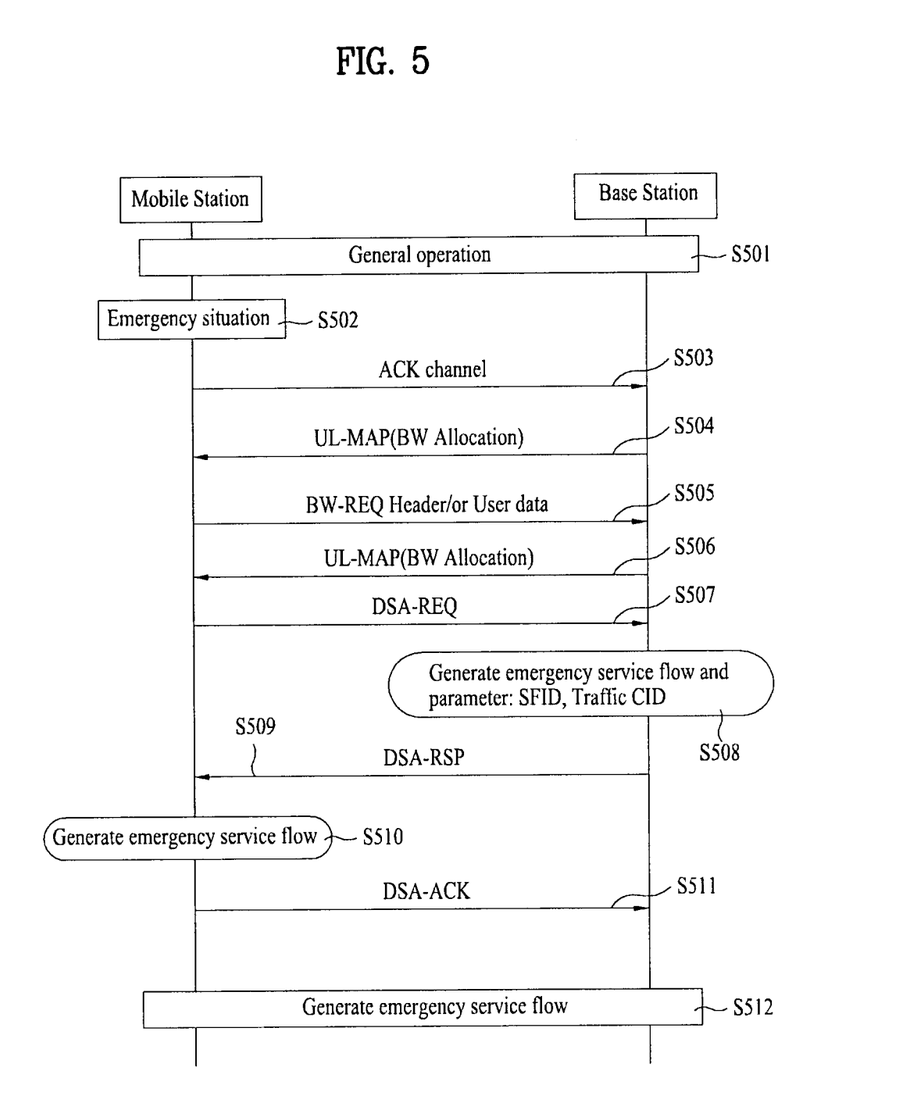
FIG. 5 is a flow chart illustrating a method of transmitting emergency service request information using an ACK/NACK channel by a mobile station according to another exemplary embodiment of the present invention.

FIG. 5 is a flow chart illustrating a method for a mobile station to transmit emergency service request information using an ACK/NACK channel according to another exemplary embodiment of the present invention.

Referring to FIG. 5, a method for requesting a basic emergency service by the mobile station is similar to the method of transmitting emergency service request information shown in FIG. 4. Therefore, a general operation procedure (step S501) is similar to the general operation (step S301) shown in FIG. 3. However, an ACK/NACK channel is used in FIG. 5, whereas the CQI channel is used when the mobile station request that the base station provide the emergency service in FIG. 4.

That is, in another exemplary embodiment of the present invention, a new channel as is used in a general method for performing an emergency service operation between the mobile station and the base station is not allocated. Instead, if a specific control channel (for example, a CQI channel or an ACK/NACK channel) has been formed between the mobile station and the base station, an emergency service can be requested using the ACK/NACK channel which is one of control channels.

After a connection is established between the mobile station and the base station, an emergency situation may occur that the mobile station requests that the base station provide an emergency service or emergency data delivery service (step S502).

In another exemplary embodiment of the present invention, it is assumed that the control channel has been formed between the mobile station and the base station. The control channel refers to an uplink channel or a downlink channel allocated to the mobile station by the base station. The CQI channel and the ACK/NACK channel are control channels. In another exemplary embodiment of the present invention, the mobile station may use the ACK/NACK channel and request that the base station provide a contention-free-based emergency service using, especially, the ACK channel (step S503).

In step S503, the mobile station may make a request for an emergency service using a designated code instead of the ACK signal. The designated code in the ACK channel may use 2 bits or more. It is assumed that 2 bits are designated in the ACK channel. However, a code more than 2 bits may be used according to system requirements or communication environments.

The following Table 6 illustrates subcarrier modulation comprised of a 2-bit symbol of the ACK channel.

TABLE 6

| ACK 2-bit Symbol | Vector Index per tile Tile(0), Tile(1), Tile(2) |
|---|---|
| 00 | 0, 0, 0 |
| 01 | 4, 7, 2 |
| 10 | x, x, x |
| 11 | x, x, x |

In Table 6, since a symbol used in the ACK channel is expressed as 2 bits, the symbol indicates 00, 01, 10, or 11. The symbol '00' may indicate transmission failure as in an existing ACK channel and the symbol '01' may indicate transmission success. If the NACK channel is used, the symbol '00' may indicate transmission success and the symbol '01' may indicate transmission failure.

Therefore, the mobile station may request, using one of the other symbols '10' and '11', that the base station provide an emergency service.

The vector index value shown in Table 6 is arbitrarily set and may vary according to a system. In Table 6, 'x' indicates "don't care" and represents that any value for minimizing a detection code error rate may be used. For example, the ACK 2-bit symbol of '10' may use '1, 1, 1' as the vector index value per tile and the ACK 2-bit symbol of '11' may use '7, 7, 7' as the vector index value per tile.

The method of making a request for the emergency service through the ACK/NACK channel in FIG. 5 may have advantages over the method of making a request for the emergency service through the CQI channel in FIG. 4. When using the CQI channel, the mobile station utilizes 6 designated bits. However, when using the ACK/NACK channel, 1 to 3 bits, especially 2 bits, are employed. Accordingly, a more efficient service request can be made using the ACK/NACK channel than using the CQI channel. Consequently, the mobile station can save transmission power and uplink wireless resources.

As another method of making a request for the emergency service in step S503, a control signal may be phase-shifted and then may be transmitted to the base station. That is, if the base station broadcasts a specific phase shift value to the mobile station through a UCD message, the mobile station shifts a phase of a CQI code value designated by the phase shift value, when transmitting the 2-bit symbol of the ACK channel during the emergency service request.

Since steps S504 to S512 are similar to steps S404 to S412, a repetitive description will be omitted but it will be apparent to those skilled in the art that the omitted contents can be supplemented through a description in conjunction with FIG. 4.

The terms used in the exemplary embodiments of the present invention are variable according to requirements of the system. For example, the mobile station used in the exemplary embodiments of the present invention may be referred to as a user equipment or a mobile node and the base station may be referred to as a fixed station or a node-B.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The exemplary embodiments of the present invention may be applied to a broadband wireless access system and applied to all methods using a control channel.

The invention claimed is:

1. A method for requesting an emergency service in a wireless access system, comprising:
    performing a negotiation to determine whether the emergency service is supported during a basic capability negotiation process;
    transmitting, by a mobile station, a predetermined code for requesting the emergency service to a base station through an acknowledgement/negative-acknowledgement (ACK/NACK) channel, when the ACK/NACK channel is allocated to the mobile station, without requesting allocation of a new control channel for the emergency service,
    wherein the ACK/NACK channel is a contention-free-based control channel that is dedicated to the mobile station,
    wherein the predetermined code is phase-shifted by a specific phase shift value received from the base station through a UCD (Uplink Channel Descriptor) message;
    receiving, by the mobile station, an uplink map (UL-MAP) message to allocate a bandwidth from the base station;
    transmitting, by the mobile station, a dynamic service addition request message requesting information for the emergency service to the base station through the allocated bandwidth; and
    receiving, by the mobile station, a dynamic service addition response message comprising a traffic connection identifier and a quality of service parameter set for the emergency service from the base station,
    wherein the traffic connection identifier is mapped with a service flow identifier for the emergency service flow.

2. The method according to claim 1, wherein the predetermined code is selected from previously designated codes for the emergency service among codes designated for the ACK/NACK channel.

3. The method according to claim 2, wherein the predetermined code has 2 bits per symbol.

4. A method for providing an emergency service in a mobile communication system, comprising:

performing a negotiation to determine whether the emergency service is supported during a basic capability negotiation process;

receiving, by a base station, a predetermined code for requesting the emergency service from a mobile station through an acknowledgement/negative-acknowledgement (ACK/NACK) channel, when the ACK/NACK channel is allocated to the mobile station, without requesting allocation of a new control channel for the emergency service, wherein the ACK/NACK channel is a contention-free-based control channel that is dedicated to the mobile station, wherein the predetermined code is phase-shifted by a specific phase shift value transmitted by the base station through a UCD (Uplink Channel Descriptor) message;

transmitting, by the base station, an uplink map (UL-MAP) message to allocate a bandwidth to the mobile station;

receiving, by the base station, a dynamic service addition request message requesting information for the emergency service from the mobile station through the allocated bandwidth;

generating, by the base station, an emergency service flow and a parameter related to the emergency service; and transmitting, by the base station, a dynamic service addition response message comprising a traffic connection identifier and a quality of service parameter set for the emergency service to the mobile station, wherein the traffic connection identifier is mapped with a service flow identifier for the emergency service flow.

5. The method according to claim 4, wherein the predetermined code is selected from previously designated codes for the emergency service among codes designated for the ACK/NACK channel.

6. The method according to claim 5, wherein the predetermined code has 2 bits per symbol.

\* \* \* \* \*